United States Patent
Östbo

(10) Patent No.: US 6,333,190 B1
(45) Date of Patent: Dec. 25, 2001

(54) METHOD AND ARRANGEMENT FOR COMPOSTING BIODEGRADABLE MATERIAL

(76) Inventor: Bertil Östbo, Byvägen 84, S-151 52 Södertälje (SE)

( * ) Notice: Subject to any disclaimer, the term of this patent is extended or adjusted under 35 U.S.C. 154(b) by 0 days.

(21) Appl. No.: 09/446,153

(22) PCT Filed: Jun. 18, 1998

(86) PCT No.: PCT/SE98/01193

§ 371 Date: Feb. 9, 2000

§ 102(e) Date: Feb. 9, 2000

(87) PCT Pub. No.: WO98/57908

PCT Pub. Date: Dec. 23, 1998

(30) Foreign Application Priority Data

Jun. 18, 1997 (SE) ................................. 9702332

(51) Int. Cl.[7] ................................. C05F 3/04; C05F 3/06
(52) U.S. Cl. ................................. 435/290.4; 71/8; 4/484; 4/DIG. 12
(58) Field of Search ................................. 435/290.1–290.4; 4/DIG. 12, 484; 71/8–10

(56) References Cited

U.S. PATENT DOCUMENTS

| | | | |
|---|---|---|---|
| 1,223,711 | * | 4/1917 | Mershon . |
| 3,203,007 | * | 8/1965 | Olson . |
| 3,448,467 | * | 6/1969 | Smith . |
| 3,683,426 | | 8/1972 | Lagstrom . |
| 3,927,985 | * | 12/1975 | Hyttinge et al. . |
| 4,621,380 | * | 11/1986 | McGill . |

FOREIGN PATENT DOCUMENTS

| | | |
|---|---|---|
| 176592 | 5/1995 | (NO) . |
| 8501825-7 | 11/1988 | (SE) . |
| WO 96/08616 | 3/1996 | (WO) . |

* cited by examiner

*Primary Examiner*—William H. Beisner
(74) *Attorney, Agent, or Firm*—Sughrue Mion, PLLC

(57) ABSTRACT

Arrangement for collecting and composting night-soil and other biodegradable material, comprising a space (23) in which a starting bed (29) has been spread out in order to accelerate the breakdown of material (30) which is dropped down onto the starting bed. The space (23) is lined with an inner layer of a flexible, liquid-impermeable material forming a sack-like container (8) which is open at the top. The starting bed (29) is arranged in the sack-like container, and the arrangement comprises members (40) for pressing the upper edge portion of the container against a ceiling (36) which is located under the floor (32) of at least one overhead toilet and is provided with at least one opening for attachment to a toilet bowl. The sack-like container (8) is designed to enclose the material (30) while the latter is being broken down, and the container comprises members for conveying liquid, which has been separated off from the material, via a screen arrangement (31). The sack-like container (8) is also designed to serve as an enclosure for transporting the completely or partially broken down material. The invention also relates to a method for collecting and composting night-soil.

14 Claims, 4 Drawing Sheets

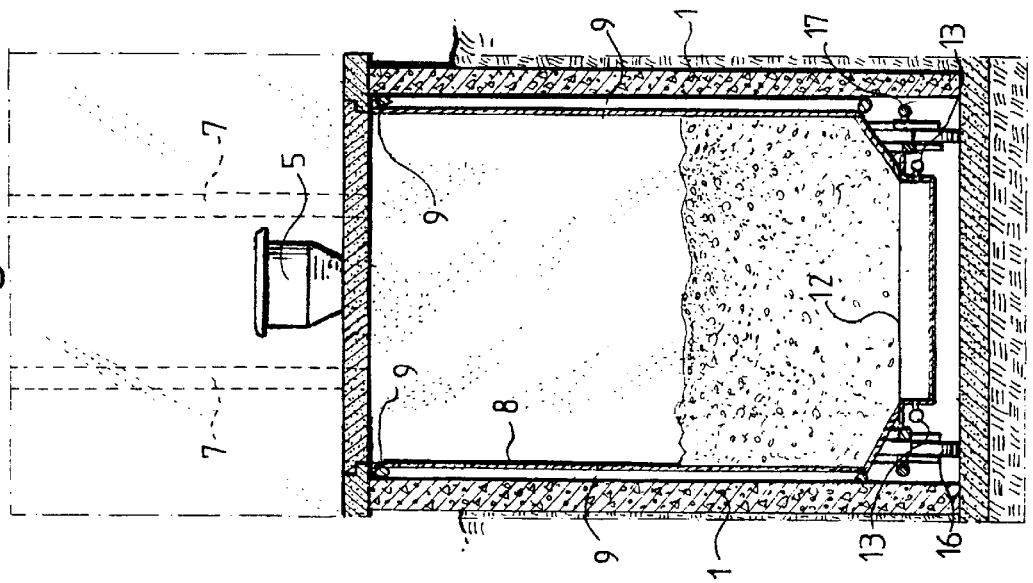
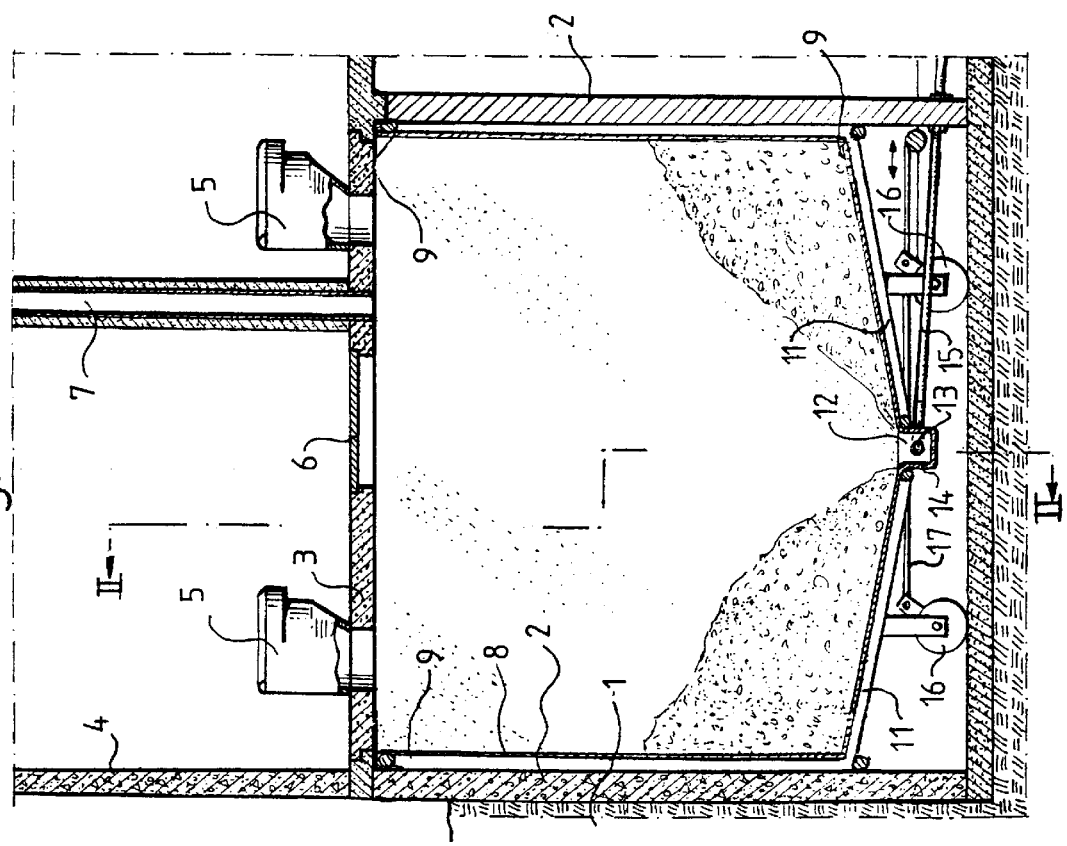

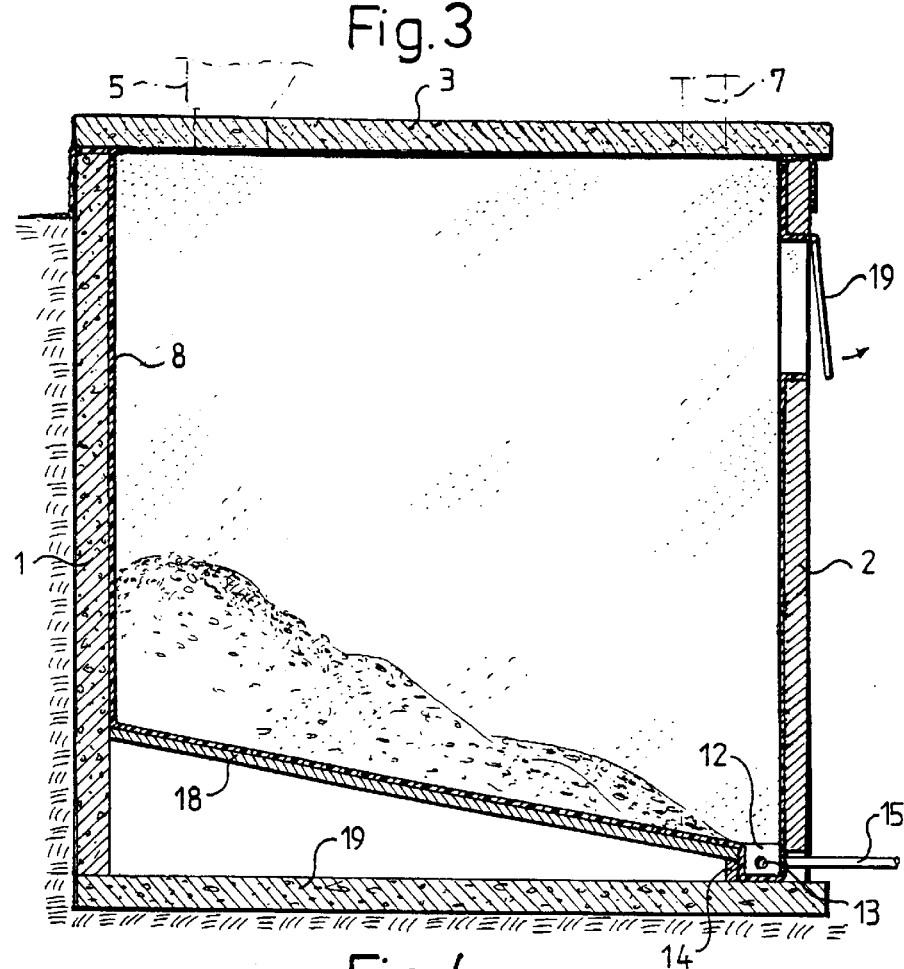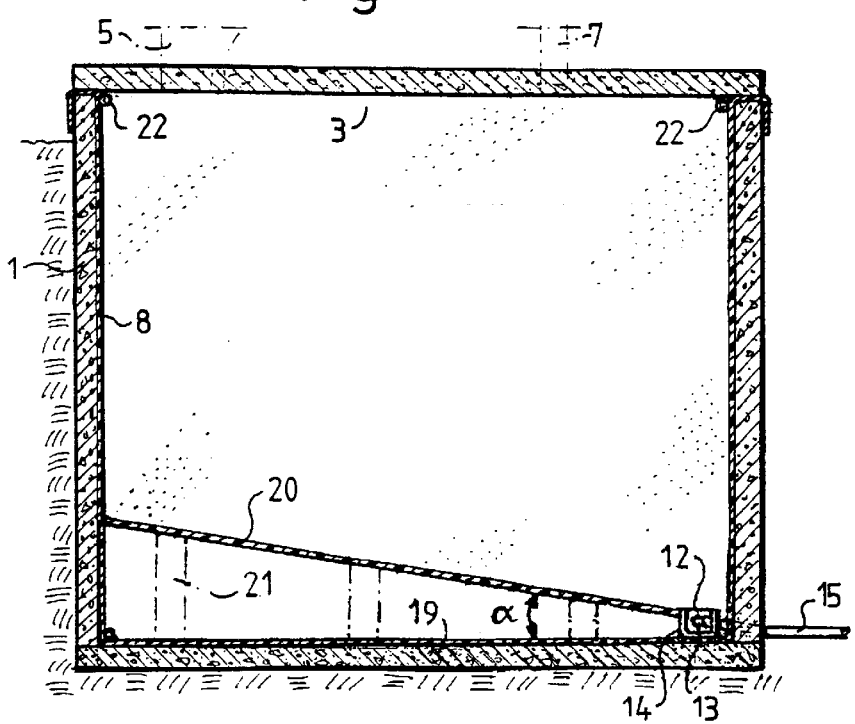

METHOD AND ARRANGEMENT FOR COMPOSTING BIODEGRADABLE MATERIAL

The present invention relates to a method for collecting and composting night-soil and other biodegradable material, in which method the material to be composted is delivered to a space in which a starting bed has been spread out in order to accelerate the breakdown of the delivered material, which is dropped down onto the starting bed, and liquid is separated off from the material and conveyed out from the space for separate processing. The invention also relates to an arrangement for use in implementing the method.

Composting arrangements of the type specified above have long been well known and, from the environmental point of view, represent a much better alternative, for management of biodegradable material, than the water-flushing systems which are commonly used today and which cause serious and increasing damage to the environment. No detailed description of the breakdown process employed will be given here, as this is well documented in, among other places, the patent literature.

If composting arrangements of this type, which can deal not only with night-soil, but also with other degradable domestic waste, are to have wider practical application, it will be necessary for the arrangements to be easy to operate, for their capacity to be increased and adapted to different requirements and conditions, and for them to permit simple rectification of operating disruptions, for example after sabotage or incorrect use.

In earlier composting arrangements of this type, the material is broken down in a fixed container, in which case the compost earth formed is removed via a lower hatch. This arrangement functions well in many cases but can be improved in several respects. This applies, inter alia, to raking out the compost earth, which is done by opening the hatch and raking the earth out into an open container. This may not be altogether acceptable, especially in those cases where the container is placed in a dwelling area or the like.

Removing and replacing the compost bed with a new one, for example after sabotage or incorrect use, where, for instance, an agent intended for a chemical toilet has been poured down into the compost and brought the biodegradation process to a standstill, is a time-consuming and unpleasant task, as the old bed has to be raked out into an open receptacle. Corresponding problems may arise in the event of accidental overloading of a toilet installation, which means that the container has to be emptied before the material has had time to break down. Alternatively, the composting arrangement has to be closed down for a time until the biological process has been able to catch up.

The same problems also arise in the event of temporary use of composting arrangements of this type in, for example, refugee camps or at other locations where large numbers of people gather for an indefinite period of time. When a camp of this kind is to be disbanded, the compost containers also contain fresh night-soil, which has to be dealt with. In this case, there are also serious risks of spread of pathogenic bacteria.

Also, when the owner of a house or apartment equipped with a composting arrangement is moving, it may also be desirable to be able to remove the old composting material and set up a new compost bed.

An object of the present invention is to make available a simple and inexpensive composting arrangement which solves, among other things, the abovementioned problems relating to the management of compost earth, and composting material in the process of breaking down, with minimum risk of spread of infection.

Another object of the invention is to substantially increase the capacity of composting arrangements of this type, among other things by accelerating the breakdown of the delivered material and rendering this breakdown more efficient.

The invention is based on the recognition that, when composting, a volume reduction of 95–98% of the solid material is obtained after complete breakdown to compost earth. This means that a composting container can be used for a long time without needing to be emptied or replaced, on condition that the volume of the entire container can be utilized for composting purposes.

Thus, if a simple and inexpensive container can be found, it will be possible to let the composting take place in the container and, when the latter is full after a long period of use, to replace the entire container with a new one. This avoids the need for continuous raking of the compost earth that has formed, with consequent risks of infection upon contact with incompletely broken down faecal matter.

According to the present invention, this is achieved by the fact that the composting is allowed to take place in a container lined with an inner layer of a flexible, liquid-impermeable material, forming a sack-like container, open at the top, for the composting material.

By means of the fact that the composting can take place in the sack-like container, which also encloses the material upon replacement of the container with a new one, all contact with the material, and thus the risk of infection, are avoided.

By replacing previously known, fixed containers with simple, inexpensive containers consisting of a support structure and an inner tight and flexible lining, it is possible, upon temporary overloading of a composting arrangement, to replace the flexible, sack-like container with a new one and to leave the exchanged container to rest until the biological process has been able to catch up, at which point it can be reinserted into the installation. Alternatively, because of the low cost, the sack-like container can be transported away to a final collection depot for subsequent composting until all the material has been converted to compost earth.

In order to increase the capacity of a composting container and to heighten the efficiency of the breakdown of the delivered material, a further development of the invention provides that the arrangement is designed in such a way that it can be moved between different positions under an opening through which material is delivered to the container. In this way, the delivered material can be distributed across the entire compost bed in the container, which affords a more rapid breakdown as a result of, on the one hand, a larger contact surface with the bacteria-containing and maggot-containing starting bed, and, on the other hand, a greater surface area exposed to the atmospheric oxygen. In addition, the volume of the container can be utilized to the maximum.

According to the invention, this is achieved by the fact that the sack-like container is open at the top and is designed in such a way that it can be pressed in different positions against a ceiling or lowered false ceiling arranged under the floor of an overhead toilet, which ceiling or false ceiling thus forms the cover of the container during the collection period. In this way, the capacity of the arrangement can be multiplied compared to an installation with a container which is fixed in a defined position.

The specific characteristics of a method and an arrangement for collecting and composting night-soil and other biodegradable material are stated in claims 1 and 6, respectively. Further features of the invention will be evident from the subclaims which refer to the respective independent claims.

By means of the fact that the composting takes place in a sack-like container, all the composting material, both old and fresh, can simply be removed as and when required, for example if the breakdown process has come to a standstill. Thereafter, a new container with a functioning composting bed is inserted. All manipulation of the composting material thus takes place with the latter in a closed, sack-like container, which among other things prevents the spread of pathogenic bacteria, or of eggs from parasite organisms, such as, for example, Schistosoma mansoni, bilharzia. The closed container can also be managed without difficulty in dwelling areas. In addition, the sack-like container can be inserted in any space and does not require any costly, specially manufactured container. For example, in refugee camps, the flexible container can be placed in a space made up of simple boards or panels, as the walls do not themselves need to be tight.

The invention will be described in greater detail below with reference to the embodiments which are shown as examples in the attached drawings.

FIG. 1 is a section through a first embodiment of a composting arrangement according to the invention.

FIG. 2 is a section along the line II—II in FIG. 1.

FIG. 3 is a section through a second embodiment of an arrangement according to the invention.

FIG. 4 is a section through a third embodiment of an arrangement according to the invention.

Figure 5:
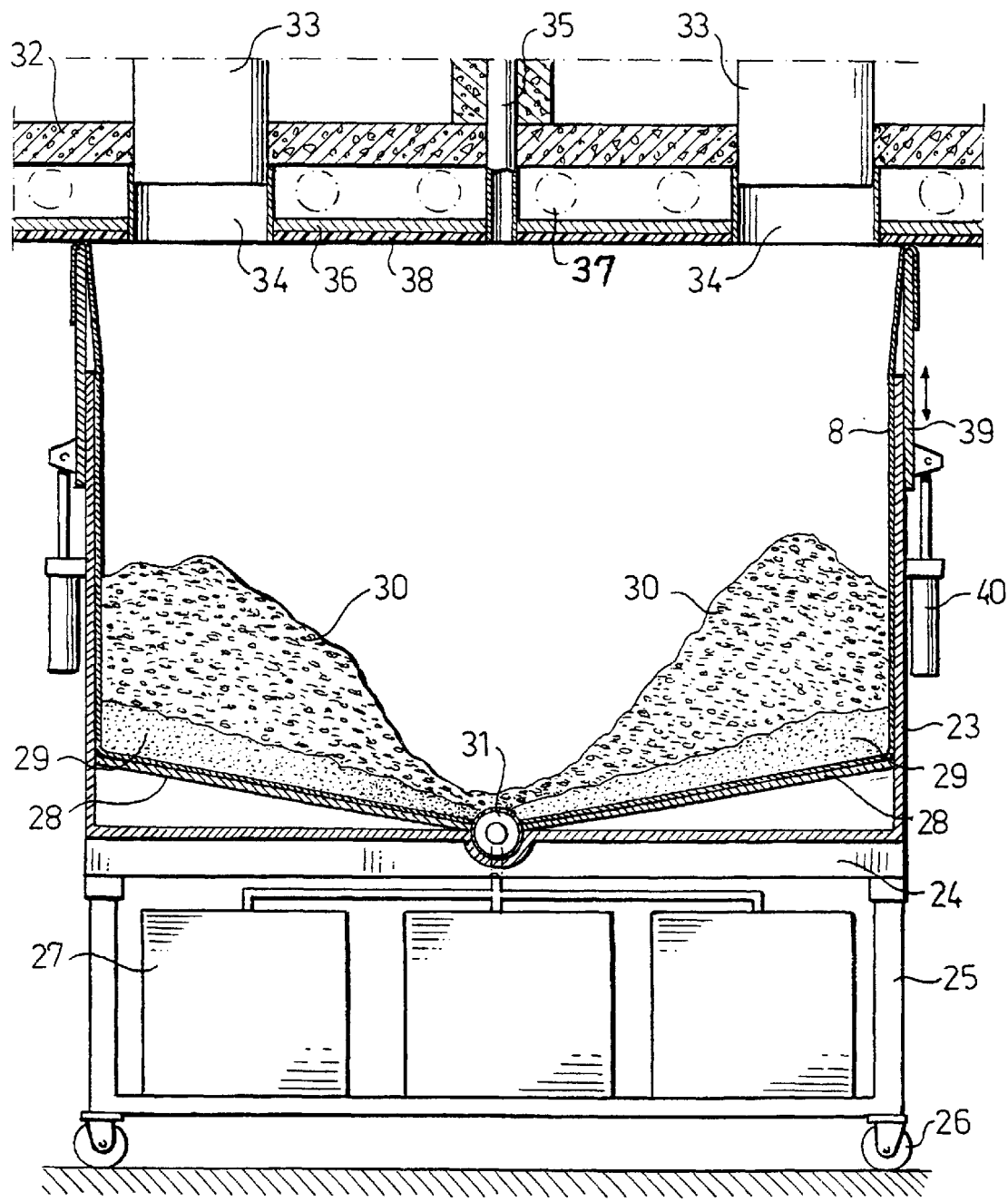
FIG. 5 is a section through a further development of a composting arrangement according to the invention.

In FIGS. 1 and 2, reference number 1 designates the walls of a concrete caisson partly buried in the ground and with a wall or door 2 that can be opened. The concrete caisson is used as a composting space for composting of night-soil and other biodegradable material. The top or ceiling of the concrete caisson in this case forms the floor 3 of a toilet 4 supported by the concrete caisson. The floor 3 can comprise a concrete slab or equivalent supported by the concrete caisson. Toilet bowls 5 can in this case be cast in one piece with the slab but can of course also consist of conventional toilet bowls. Reference number 6 designates a hatch in the floor 3, which hatch can be used as a drop for kitchen waste or other biodegradable material. Reference number 7 designates ventilation shafts which are expediently provided with built-in fans and are arranged in partition walls between the toilets.

The concrete caisson 1 is lined with a layer of a flexible, liquid-impermeable material which forms a sack-like container 8, which is pressed against the walls of the caisson and the ceiling with the aid of, for example, telescopic rods 9 which stretch the container out and hold it pressed tight against the ceiling 3. Other arrangements can of course also be used for holding the sack-like container stretched out and in tight contact against the cover 3.

In the embodiment according to FIGS. 1 and 2, the bottom of the sack-like container 8 is supported by two planes 11 inclined towards each other, the bottom of the sack being provided with a screen arrangement 12 situated between the inclined planes. The sack bottom is in this case provided with a liquid outlet 13 at each end of a channel-shaped portion 14 located under the screen 12. The liquid outlet 13 can also be used for clearing the channel 14 of finely particulate material which has passed through the screen 12. Reference number 15 designates a pipe connected to one or both of the liquid outlets 13, which pipe carries liquid to a collection tank situated outside the concrete caisson. This is expediently situated at a lower level than the inclined planes 11, so that the liquid can flow by gravity. In this way it is possible to avoid the risk of liquid accumulating in the container 8, for example in the event of a pump failure.

The inclined planes 11 are supported by rollers 16, and these can serve as a means of transporting the container 8 with the composting material, when the latter is to be removed from the space, which can be done once the front wall or door 2 has been removed.

In this embodiment, the rollers 16 are designed with an eccentric mechanism that can be manoeuvred by means of a rod 17. By means of the latter, the inclined planes 11 can be lifted to press the upper edge of the container 8 tightly against the ceiling 3 by means of the vertical pipes 9, or can be lowered in order to release the engagement with the ceiling 3 when rolling out the container 8 with the composting material.

The function of the inclined planes 11 is, among other things, to separate liquid from the solid material and to convey this liquid down to the screen arrangement 12, so that it can be carried out of the container 8. The remaining amount of solid material is very small, for which reason the container 8 only needs to be replaced at intervals of many years. When such replacement is required, the old container is rolled out from the concrete caisson and a new sack-like container is inserted, with a starting bed of microorganisms and maggots spread across its bottom. Such replacement can also take place if the breakdown process has for some reason come to a standstill, or if the toilet installation has temporary been overloaded.

As the breakdown process takes place in the sack, leakage to the environment is prevented and the composting material can be dealt with simply and without problem even if it contains fresh material. The risk of spread of infection is also eliminated.

If, at the time of replacement, the sack contains fresh material, it can be placed at a suitable depot for subsequent composting for one or two years until a complete breakdown of the material has taken place. In this case, an air intake is expediently introduced into the material to supply necessary oxygen to the latter for effective breakdown. The sack is preferably made of a plastic material which degrades after about two years' exposure to sunlight in the depot. At the end of this time, the depot consists only of compost earth, which represents an efficient cultivating agent or fertilizer agent. It can also be used as a starting bed in a compost container.

Another advantage of the arrangement shown is that no extra container is needed, and the space of the concrete caisson is utilized optimally, since no space is needed to the side of the sack for the purpose of raking out the compost earth.

FIG. 3 shows an alternative embodiment with a smaller composting space, which can also consist of a concrete caisson 1 or the like with a support ceiling 3 which forms the floor of an overhead toilet area. The difference in relation to the previously described embodiment is that the concrete caisson has been designed with one inclined base 18 which serves as an inclined plane for separating the liquid and conveying it to the screen arrangement 12. Thus, as in the previous embodiment, the liquid is conveyed from a channel-shaped portion 14 situated under the screen arrangement 12 and through a pipe 15 to an outer collection tank. Reference number 19 designates a hatch which is arranged in the front and which can be used for throwing in garden rubbish, for example. In this embodiment, the upper portion of the sack 8 is clamped fast between the floor 3 and the walls of the concrete caisson 1. In smaller installations of this type, the sack 8 can be lifted out manually and replaced by a new one once the front or door 2 has been opened.

The inclined plane 18 inserted as an extra base can of course consist of the base plate of the concrete caisson 1, in which case the horizontal plate 19 shown in the figure can be omitted. An advantage of an extra base 18 is, however, that this can be inserted loosely into the concrete caisson, so that the angle of inclination can be modified as required. In the arrangement shown in FIGS. 1 and 2 also, the inclined planes 11 are expediently designed such that their angles can be adjusted.

The embodiment according to FIG. 4 differs from the one according to FIG. 3 essentially in that the inclined plane 20 is designed in the form of a plate arranged in the sack 8. The sack 8 thus extends right down to the base plate 19 of the concrete caisson 1. The plane 20 is supported in the sack with the aid of supporting legs or supporting stands 21 which are designed in such a way that the angle α of the plane 20 can be varied as required.

In this embodiment, the screen arrangement 12 is arranged in the inclined plane, which simplifies and reduces the cost of the manufacturing of the sack. The latter in this case needs only to be provided with an outlet attachment 15 for the liquid passing through the screen arrangement 12.

To achieve a good seal between the inclined plane 20 and the surrounding walls, the inclined plane in this embodiment is provided with an all-round, hose-like seal along the edge surfaces. This is pressed by the inclined plane into sealing contact against the sack 8, which in turn is pressed against the walls of the concrete caisson. This prevents solid material from passing into the space below the inclined plane 20.

In this embodiment, the upper edge portion of the sack 8 is pressed against the ceiling 3 of the concrete caisson for example with the aid of tubular rods 22.

FIG. 5 shows a further development of a composting arrangement according to the invention. In this, reference number 23 designates a rigid container, which can be made up, for example, of simple boards. The container 23 is supported by a carriage 24, which is supported on legs 25 with wheels 26. Reference number 27 designates collecting tanks for liquid which is separated off during composting. These tanks can alternatively be placed outside the installation or replaced by a large tank common to several collection containers.

The container 23 is lined with a layer of a flexible, liquid-impermeable material, which, in the same way as has been described above, forms a sack-like container 8 that is open at the top. The bottom of the container is supported in this embodiment by two planes 28 which are inclined towards one another and on which a bed of compost earth, with the necessary bacteria and maggots, has been spread out to function as a starting bed 29. As a result of the inclined planes 28, the liquid which is separated off from the material in the compost heaps 30 is led down to the screen arrangement 31 which, for example, can comprise perforated outer and inner tubes, with a filtering composition, such as sand, in the outer tube. The sack is in this case provided with a valvefitted outlet from the inner tube to the collection tanks 27.

The movable container 23 is arranged in a space under the floor 32 of an overhead toilet with drums 33 connected to toilet bowls (not shown). These drums are introduced into drums 34 which are expediently telescopically movable relative to the drums 33 and project down into the underlying container 23.

The space under the floor 32 in which the movable container 23 is arranged is not divided up into areas corresponding to the overhead toilet cubicles, and instead the container 23 can be displaced freely to different positions under the drums 34. This means that at certain intervals, depending on the actual loading, the container 23 can be displaced in stages between different positions so that several heaps of composting material 30 are built up alongside each other on the inclined planes. The surface of the compost bed 29 can be utilized optimally in this way, since the material which is to be broken down can be distributed essentially evenly across the entire compost bed. This means, among other things, that a greater surface area of the composting material will be in contact with the compost bed 29, which accelerates the breakdown of the composting material by the bacteria and maggots in the bed. In addition, the atmospheric oxygen is able to gain access to a greater surface area of the composting material.

As the height of each heap 30 of composting material can in this case be made smaller, the height of the container can be reduced. In any case it is possible to achieve more efficient utilization of the volume e in a given container.

As the container 23 is open at the top, it can be displaced in desired stages without reference to openings made beforehand in a cover of the container. In order to achieve a tight sealing of the container 23, however, the latter is designed so that in each position it can be pressed up against a ceiling located under the overhead toilet, which ceiling in this case forms the cover of the container. In the embodiment shown, use is made of a false ceiling 36 under the floor 32. This design means, inter alia, that the necessary pipes 37 to the toilet cubicles can be laid in the space between the floor 32 and the false ceiling 36. The false ceiling is expediently provided with a soft lower layer 38, for example of a foam plastic material, which means that it is possible to achieve a good seal against the container 23, in any position, by pressing the walls of the container up against the soft layer.

In the embodiment shown, the container 23 is provided with a telescopically movable upper section 39 which can be pressed up against the false ceiling 36 by means of suitable members, for example hydraulic cylinders 40. This can also be done using screws, cables or the like. Alternatively, the legs 25 of the carriage can be raised and lowered telescopically. It is also possible to arrange wedges under the wheels 26, which raise the whole container towards the ceiling in the desired positions, or to lift the container with the aid of jacks. Reference number 35 designates an air duct.

By using a false ceiling in accordance with the above, it is possible to eliminate all the problems which arise if the original ceiling is not sufficiently level, or if pipes laid on the underside of the floor 32 make it difficult to achieve a seal between the upper edges of the side walls of the container 23 and the ceiling.

As an alternative to the soft layer 38 on the underside of the false ceiling 36, the telescopic wall sections 39 of the container can be provided with a seal, for example an inflatable hose, along its upper edge, which is pressed against the false ceiling.

Figure 6:
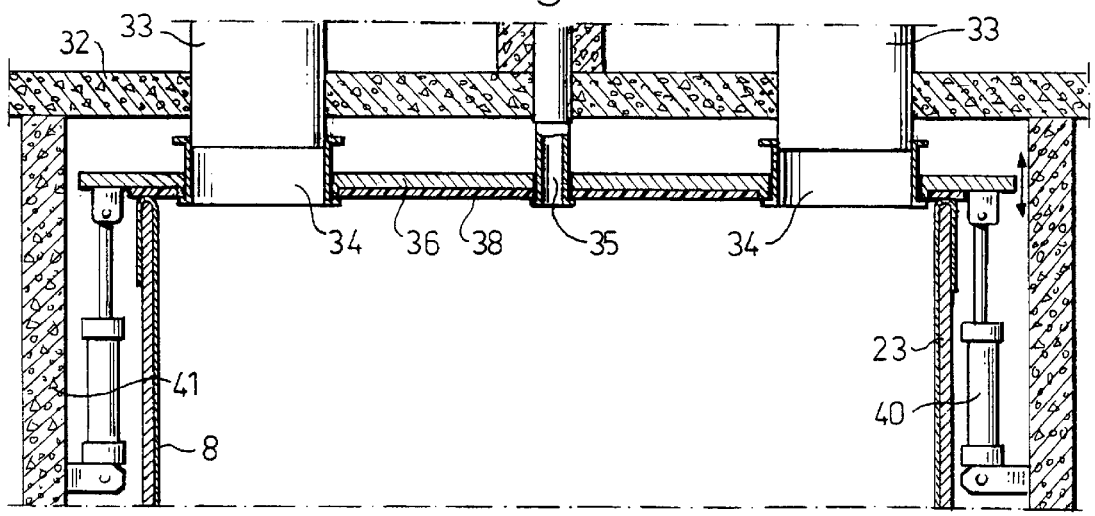
FIG. 6 shows an alternative design of the ceiling construction in an arrangement according to FIG. 5.

FIG. 6 shows an alternative embodiment in which the false ceiling 36 with its soft layer 38 can be raised and lowered, for example with the aid of hydraulic cylinders 40.

The ceiling is thus lifted when the position of the container 23 is to be changed, after which it is lowered again towards the container so that the upper edge thereof is pressed sealingly against the soft material layer 38.

In another design, the ceiling 36 is suspended on cables, by which the ceiling 36 can be lifted during displacement of the container. The ceiling is then lowered again towards the container and pressed against the upper edge of the latter as a result of its inherent weight.

In FIG. 6, the area 41 in which the movable container 23 is arranged has such a form that the container can only be displaced to and fro in one direction. However, it is preferable for the area to have such a form that the container 23 can be displaced both lengthways and sideways, and so that it can be swivelled round. In this way it is possible to spread the composting material in small heaps across the whole of the compost bed arranged in the container.

Figure 7:
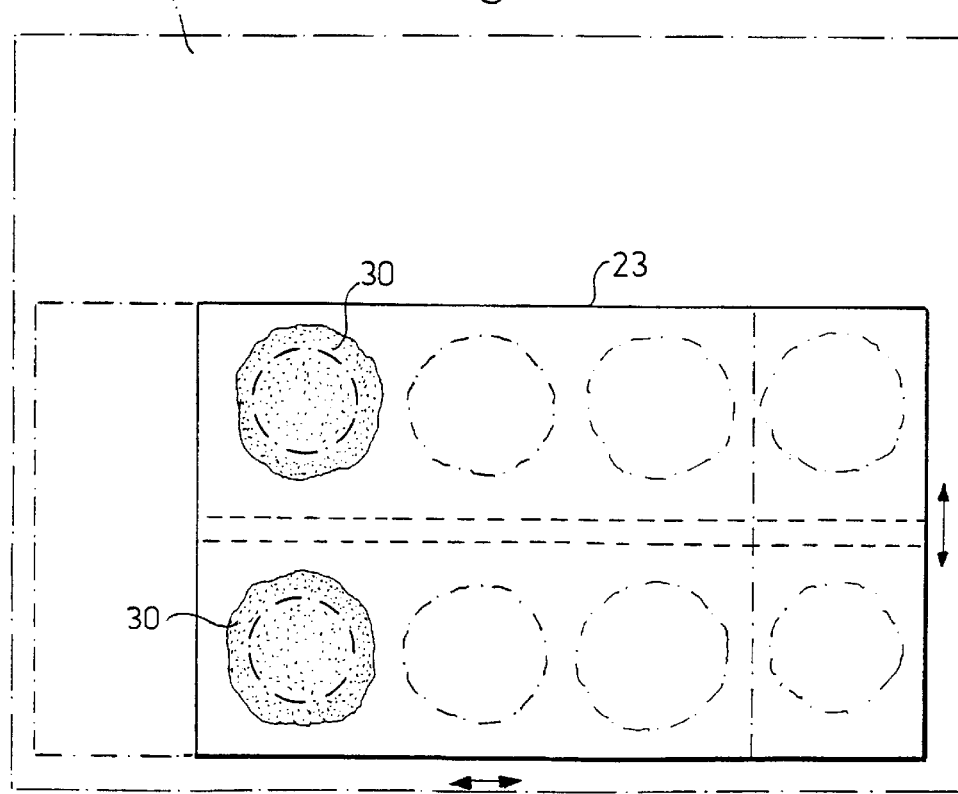
FIG. 7 illustrates diagramatically how delivered composting material can be distributed across the compost bed in a collecting container.

FIG. 7 is a diagrammatic illustration of how two heaps 30 of compost material have first been allowed to build up at one end of the container 23. The container can then be displaced within the limits of the false ceiling 36 so that two new heaps are formed alongside the first ones. Thereafter, the container can be swivelled through 180°, whereupon four further heaps can be formed at the other end of the container. When this has been done, the container can be swivelled back, whereupon material is built up on the first heaps which have been left alone for some time and whose volume has been reduced very considerably. It will be appreciated that in this way it is possible to utilize the volume of the container 23 to the maximum extent before it needs to be replaced with a new container.

The invention has been described above in connection with the embodiments shown in the drawings. However, these can be varied in several respects within the scope of the patent claims. One and the same container can thus be used for one, two or more toilet bowls. Instead of two planes inclined towards each other, as in FIG. 5, the container can also be provided with two planes inclined away from each other, in which case a screen arrangement is arranged along two opposite walls of the container. The container can of course also be designed with only one plane. The screen can alternatively be arranged under the sack, in which case the sack is provided with openings for conveying the liquid down into the screen. The liquid can also be conveyed to the screen in another way, for example with the aid of sloping grooves in the bottom surface of the container, in which case the inclined planes can be entirely omitted.

What is claimed is:

1. A method for collecting and composting material delivered to a space, the method comprising the steps of:
   lining the space with a layer of a flexible liquid-impermeable material forming a sack-like container which is open at the top;
   providing a starting bed in the sack-like container, the starting bed accelerating the composting of the material;
   pressing an upper edge portion of the sack-like container against a fixed ceiling by means of a relative movement between the sack-like container and the fixed ceiling, which is located under a floor of at least one overhead toilet and is provided with at least one opening for attachment to a toilet bowl;
   composting the material in the sack-like container;
   conveying liquid separated from the material out of the sack-like container via a screen arrangement; and
   transporting the material out of the space while the material is located in the sack-like container.

2. The method according to claim 1, wherein the sack-like container, together with the material, is transported to a depot for subsequent composting of the material in the sack-like container.

3. The method according to claim 2, further comprising the step of:
   providing means for supplying oxygen to the material in the sack-like container to accelerate the composting of the material.

4. A method for collecting and composting material delivered to a space, the method comprising the steps of:
   lining the space with a layer of a flexible liquid-impermeable material forming a sack-like container which is open at the top;
   providing a starting bed in the sack-like container, the starting bed accelerating the composting of the material;
   composting the material in the sack-like container;
   conveying liquid separated from the material out of the sack-like container via a screen arrangement; and
   transporting the material out of the space while it is located in the sack-like container;
   wherein an upper edge portion of the sack-like container is pressed against a false ceiling, which is arranged under a floor of a toilet, as a result of a relative movement between the false ceiling and the upper edge portion of the container.

5. A method for collecting and composting material delivered to a space, the method comprising the steps of:
   lining the space with a layer of a flexible liquid-impermeable material forming a sack-like container which is open at the top;
   providing a starting bed in the sack-like container, the starting bed accelerating the composting of the material;
   composting the material in the sack-like container;
   conveying liquid separated from the material out of the sack-like container via a screen arrangement; and
   transporting the material out of the space while it is located in the sack-like container;
   wherein the space is defined by a casing on a movable carriage, so that the sack-like container is moveable between different positions in an area under a toilet so that the material delivered from at least one toilet bowl forms heaps spread across the starting bed in the sack-like container.

6. An arrangement for collecting and composting material, comprising:
   a space (1, 2; 23) for receiving the material (30);
   a layer of a flexible liquid-impermeable material forming a sack-like container (8) lining the space, the sack-like container having an open top, and containing a starting bed (29) to accelerate the composting of the material, which is dropped down onto the starting bed;
   means (17; 40) for pressing an upper edge portion of the sack-like container against a fixed ceiling (36) via a relative movement between the sack-like container and the fixed ceiling, which is located under a floor (3; 32) of at least one overhead toilet, the fixed ceiling being provided with at least one opening for attachment to a toilet bowl (5),
   wherein the sack-like container (8) encloses the material (30) being composted, includes a member for conveying liquid separated from the material via a screen arrangement (12; 31), and serves as an enclosure during transportation of the completely or partially composted material.

7. The arrangement according to claim 6, wherein the member is at least one inclined plane (11; 18; 20; 28) arranged in or under the sack-like container (8) for separating and carrying away the liquid from the material (30) which is delivered to the space.

8. The arrangement according to claim 6, wherein the fixed ceiling is provided with a soft material layer (38) for sealing the fixed ceiling against the upper edge portion of the sack-like container (8).

9. The arrangement according to claim 6, wherein the flexible liquid-impermeable material consists of a plastic material which decomposes when the sack-like container (8) has been stored for a certain period in a depot for subsequent composting.

10. An arrangement for collecting and composting material, comprising:

a space (1, 2; 23) for receiving the material (30);

a layer of a flexible liquid-impermeable material forming a sack-like container (8) lining the space, the sack-like container having an open top, and containing a starting bed (29) to accelerate the composting of the material, which is dropped down onto the starting bed;

means (17; 40) for pressing an upper edge portion of the sack-like container against a false ceiling (36) via a relative movement between the sack-like container and the false ceiling, which is located under a floor (3; 32) of at least one overhead toilet, the false ceiling being provided with at least one opening for attachment to a toilet bowl (5), wherein the sack-like container (8) encloses the material (30) being composted, includes members for conveying liquid separated from the material via a screen arrangement (12; 31), and serves as an enclosure during transportation of the completely or partially composted material.

11. The arrangement according to claims 10, wherein the false ceiling (36) is moveable so as to be pressed against the upper edge portion of the sack-like container (8).

12. An arrangement for collecting and composting material, comprising:

a space (1, 2; 23) for receiving the material (30);

a layer of a flexible liquid-impermeable material forming a sack-like container (8) lining the space, the sack-like container having an open top, and containing a starting bed (29) to accelerate the composting of the material, which is dropped down onto the starting bed;

means (17; 40) for pressing an upper edge portion of the sack-like container against a ceiling (36), which is located under a floor (3; 32) of at least one overhead toilet, the ceiling being provided with at least one opening for attachment to a toilet bowl (5), wherein the sack-like container (8) encloses the material (30) being composted, includes members for conveying liquid separated from the material via a screen arrangement (12; 31), and serves as an enclosure during transportation of the completely or partially composted material, wherein the space is defined by a casing (23) supported by a movable carriage (24) such that the sack-like container is moveable in an area under the toilet between different positions so that the material delivered from the toilet bowl forms separate heaps (30) on the starting bed in the flexible container (8).

13. The arrangement according to claim 12, wherein the pressing means is a telescopic part (39) provided on side walls of the casing, the telescopic part being moveable for pressing the edge portion of the sack-like container (8) against the ceiling.

14. The arrangement according to claim 12, wherein the pressing means is legs (25) supporting the carriage, the legs being raisable to press the edge portion of the sack-like container (8) against the ceiling.

* * * * *